(12) United States Patent
Zhu et al.

(10) Patent No.: US 10,490,807 B2
(45) Date of Patent: Nov. 26, 2019

(54) DOPED AND COATED LITHIUM TRANSITION METAL OXIDE CATHODE MATERIALS FOR BATTERIES IN AUTOMOTIVE APPLICATIONS

(71) Applicants: Umicore, Brussels (BE); Umicore Korea Ltd., Chungnam (KR)

(72) Inventors: Liang Zhu, Chungnam (KR); Jens Paulsen, Daejeon (KR); Hyo Sun Ahn, Cheonan (KR); HeonPyo Hong, BaekSeok-Dong (KR)

(73) Assignees: Umicore, Brussels (BE); Umicore Korea Ltd., Chungnam (KR)

( * ) Notice: Subject to any disclaimer, the term of this patent is extended or adjusted under 35 U.S.C. 154(b) by 164 days.

(21) Appl. No.: 15/122,942

(22) PCT Filed: Mar. 3, 2015

(86) PCT No.: PCT/IB2015/000260
§ 371 (c)(1),
(2) Date: Sep. 1, 2016

(87) PCT Pub. No.: WO2015/132647
PCT Pub. Date: Sep. 11, 2015

(65) Prior Publication Data
US 2017/0069907 A1    Mar. 9, 2017

(30) Foreign Application Priority Data
Mar. 6, 2014  (EP) ..................................... 14158018

(51) Int. Cl.
*H01M 4/131* (2010.01)
*H01M 4/1391* (2010.01)
(Continued)

(52) U.S. Cl.
CPC ............ *H01M 4/131* (2013.01); *C01G 53/50* (2013.01); *H01M 4/0404* (2013.01);
(Continued)

(58) Field of Classification Search
CPC .. H01M 4/131; H01M 4/0404; H01M 4/0435; H01M 4/1391; H01M 4/366;
(Continued)

(56) References Cited

U.S. PATENT DOCUMENTS 6,893,776 B2 * 5/2005 Naruoka ................ C01G 51/42
              252/521.2
8,557,440 B2   10/2013 Yu
(Continued)

FOREIGN PATENT DOCUMENTS

CN          1326259 C      7/2007
CN        100433439 C     11/2008
(Continued)

OTHER PUBLICATIONS

Bang et al. "Synthesis and electrochemical properties of Li[Ni0. 45Co0.1Mn0.45-xZrx]O2 (x=0, 0.02) via co-precipitation method"; J. of Power Sources 174 (2007), pp. 565-568, available online Jun. 27, 2007. (Year: 2007).*

(Continued)

*Primary Examiner* — Gregg Cantelmo
(74) *Attorney, Agent, or Firm* — NK Patent Law

(57) ABSTRACT

A lithium metal oxide powder for use as a cathode material in a rechargeable battery, consisting of Li metal oxide core particles having a general formula $Li_{1+d}(Ni_xMn_yCo_zZr_kM'_m)_{1-d}O_{2\pm e}A_r$; wherein $Al_2O_3$ is attached to the surface of the core particles; wherein $0 \leq d \leq 0.08$, $0.2 \leq x \leq 0.9$, $0 < y \leq 0.7$, $0 < z \leq 0.4$, $0 \leq m \leq 0.02$, $0 < k \leq 0.05$, $e < 0.02$, $0 \leq f \leq 0.02$ and $x+y+z+k+m=1$; M' consisting of either one or more elements from the group Al, Mg, Ti, Cr, V, Fe and Ga; A consisting of
(Continued)

either one or more elements from the group F, P, C, Cl, S, Si, Ba, Y, Ca, B, Sn, Sb, Na and Zn; and wherein the $Al_2O_3$ content in the powder is between 0.05 and 1 wt %.

14 Claims, 10 Drawing Sheets

(51) Int. Cl.

| | | |
|---|---|---|
| *H01M 4/36* | (2006.01) | |
| *H01M 4/505* | (2010.01) | |
| *H01M 4/525* | (2010.01) | |
| *C01G 53/00* | (2006.01) | |
| *H01M 4/04* | (2006.01) | |
| *H01M 4/48* | (2010.01) | |
| *H01M 4/62* | (2006.01) | |
| *H01M 10/0525* | (2010.01) | |
| *H01M 10/0587* | (2010.01) | |
| *H01M 10/052* | (2010.01) | |
| *H01M 4/02* | (2006.01) | |

(52) U.S. Cl.
CPC ........ *H01M 4/0435* (2013.01); *H01M 4/1391* (2013.01); *H01M 4/366* (2013.01); *H01M 4/483* (2013.01); *H01M 4/505* (2013.01); *H01M 4/525* (2013.01); *H01M 4/623* (2013.01); *H01M 4/625* (2013.01); *H01M 10/0525* (2013.01); *H01M 10/0587* (2013.01); *C01P 2004/03* (2013.01); *C01P 2004/61* (2013.01); *C01P 2004/80* (2013.01); *C01P 2006/12* (2013.01); *C01P 2006/40* (2013.01); *H01M 10/052* (2013.01); *H01M 2004/028* (2013.01); *H01M 2220/20* (2013.01); *Y02E 60/122* (2013.01)

(58) Field of Classification Search
CPC ...... H01M 4/483; H01M 4/505; H01M 4/525; H01M 4/623; H01M 4/625; H01M 10/0525; H01M 10/0587; H01M 10/052; H01M 2004/028; H01M 2220/20; C01P 2004/03; C01P 2004/62; C01P 2004/80; C01P 2006/12; C01P 2006/40; Y02E 60/122; C01G 53/50
See application file for complete search history.

(56) References Cited

U.S. PATENT DOCUMENTS

| | | | |
|---|---|---|---|
| 2004/0121234 A1 | 6/2004 | Le | |
| 2005/0260497 A1* | 11/2005 | Kumashiro | B60L 11/1896 429/231.8 |
| 2005/0266316 A1* | 12/2005 | Kitao | H01M 4/131 429/246 |
| 2007/0026314 A1* | 2/2007 | Kawasato | C01G 45/1228 429/223 |
| 2011/0076556 A1 | 3/2011 | Karthikeyan | |
| 2011/0250499 A1* | 10/2011 | Hiratsuka | H01M 4/505 429/223 |
| 2012/0040247 A1* | 2/2012 | Manivannan | C04B 35/01 429/223 |
| 2013/0175469 A1 | 7/2013 | Paulsen | |
| 2013/0209885 A1 | 8/2013 | Paulsen | |
| 2013/0216913 A1* | 8/2013 | Tode | H01M 4/131 429/221 |

FOREIGN PATENT DOCUMENTS

| | | |
|---|---|---|
| CN | 102034976 | 4/2011 |
| CN | 102509784 | 6/2012 |
| CN | 102509784 A | 6/2012 |
| CN | 102870256 A | 1/2013 |
| CN | 103081189 A | 5/2013 |
| JP | 2005-340056 | 12/2005 |
| JP | 2013-171646 | 9/2013 |
| KR | 2005-0086935 | 8/2005 |
| KR | 1020060046546 | 5/2006 |
| KR | 2012-0099375 | 9/2012 |
| KR | 20140018685 A | 2/2014 |
| TW | 201212364 | 3/2012 |
| WO | 2005/096416 | 10/2005 |
| WO | 2014021626 | 2/2014 |
| WO | WO2014021626 A1 | 2/2014 |

OTHER PUBLICATIONS

Noh et al. "Comparison of the structural electrochemical properties of layered Li[NixCoyMnz]O2 (x=⅓, 0.5, 0.6, 0.7, 0.8 and 0.85) cathode materials for lithium-ion batteries"; J. of Power Sources 233 (2013), pp. 121-130, available online Jan. 19, 2013. (Year: 2013).*
Supplementary European Search Report dated Oct. 27, 2017 for European Application No. EP 15 75 8287.
Partial Korean Office Action for corresponding application dated Jul. 20, 2017.
International Search Report for PCT/IB2015/000260, dated May 29, 2015.

* cited by examiner

1 μm ⟷

DOPED AND COATED LITHIUM TRANSITION METAL OXIDE CATHODE MATERIALS FOR BATTERIES IN AUTOMOTIVE APPLICATIONS

This application is a National Stage application of International Application No. PCT/IB2015/000260, filed Mar. 3, 2015. This application also claims priority under 35 U.S.C. § 119 to European Application No. 14158018.3, filed Mar. 6, 2014.

TECHNICAL FIELD AND BACKGROUND

The invention is related to lithium transition metal oxides for use in a rechargeable battery that are doped and coated in a synergistic way to provide excellent battery materials for demanding technologies such as automotive applications.

Due to their high energy density, rechargeable lithium and lithium-ion batteries can be used in a variety of portable electronics applications, such as cellular phones, laptop computers, digital cameras and video cameras. Commercially available lithium-ion batteries typically consist of graphite-based anode and $LiCoO_2$-based cathode materials. However, $LiCoO_2$-based cathode materials are expensive and typically have a relatively low capacity of approximately 150 mAh/g.

Alternatives to $LiCoO_2$-based cathode materials include LNMCO type cathode materials. LNMCO means lithium-nickel-manganese-cobalt-oxides. The composition is $LiMO_2$ or $Li_{1+x}M_{1-x}O_2$ where $M=Ni_xCo_yMn_zM'_m$ (which is more generally referred to as "NMC", M' being one or more dopants). LNMCO has a similar layered crystal structure as $LiCoO_2$ (space group r-3m). The advantage of LNMCO cathodes is the much lower raw material price of the composition M versus pure Co. The addition of Ni gives an increase in discharge capacity, but is limited by a decreasing thermal stability with increasing Ni content. In order to compensate for this problem, Mn is added as a structural stabilizing element, but at the same time some capacity is lost. Typical cathode materials include compositions having a formula $LiNi_{0.5}Mn_{0.3}Co_{0.2}O_2$, $LiNi_{0.6}Mn_{0.2}Co_{0.2}O_2$ or $Li_{1.06}M_{0.94}O_2$, with $M=Ni_{1/3}Mn_{1/3}Co_{1/3}O_2$ (the latter referred to as NMC111). The preparation of LNMCO is in most cases more complex than $LiCoO_2$, because special precursors are needed wherein the transition metal cations are well mixed. Typical precursors are mixed transition metal hydroxides, oxyhydroxides or carbonates.

It is expected that in the future the lithium battery market will be increasingly dominated by automotive applications. Automotive applications require very large batteries that are expensive, and must be produced at the lowest possible cost. A significant fraction of the cost comes from the cathodes, i.e. the positive electrodes. Providing these electrodes by a cheap process can help to lower cost and boost market acceptance. Automotive batteries also need to last for many years. During this time batteries do not always operate. A long battery life is related to two properties: (a) small loss of capacity during storage and (b) high cycle stability.

The automotive market includes different major applications. Batteries for EV (electric vehicles) need to store energy for several hundreds of km of driving range. Thus the cells are very large. Obviously the required discharge rates do not exceed a full discharge within hours. Thus sufficient power density is easily achieved and no special concern is paid to dramatically improve the power performance of the battery. Cathode materials in such batteries need to have a high capacity and a good calendar life.

Contrary to this, HEV (hybrid electric vehicles) have much higher specific power requirements. Electrically assisted accelerations and regenerative braking require that the batteries are discharged or recharged within a couple of seconds. At such high rates the so-called Direct Current Resistance becomes important. DCR is measured by suitable pulse tests of the battery. The measurement of DCR is for example described in "Appendix G, H, I and J of the USABC Electric Vehicle Battery Test Procedures" which can be found at http://www.uscar.org. USABC stands for "US advanced battery consortium" and USCAR stands for "United States Council for Automotive Research"

If the DCR resistance is small, then the charge-discharge cycle is highly efficient; and only a small amount of ohmic heat evolves. To achieve these high power requirements the batteries contain cells with thin electrodes. This allows that (1) Li diffuses over only short distances and (2) current densities (per electrode area) are small, contributing to high power and low DCR resistance. Such high power batteries put severe requirements on the cathode materials: they must be able to sustain very high discharge or charge rates by contributing as little as possible to the overall battery DCR. In the past, it has been a problem to improve the DCR resistance of cathodes. Furthermore, it was a problem to limit the increase of DCR during the long term operation of the battery.

A third type of automotive batteries are batteries for PHEV (plug-in hybrid electric vehicles). The requirements for power are less than HEV but much more than EV type.

The prior art teaches many ways to improve the power properties as well as battery life of cathode materials. However, in many cases these requirements contradict each other. As an example, it is quite generally accepted that a decrease of particle size together with an increase of surface area can increase the power of cathode materials. However, the increase of the surface can have undesirable effects, as one important contribution to a limited battery life are parasitary (undesired) side reactions which happen between the charged cathode and the electrolyte, at the particle/electrolyte interface. The rate of these reactions will increase as the surface area increases. Therefore it is essential to develop cathode materials which have improved power, in particular a low DCR, but without further increasing the surface area of the NMC cathode.

It has been widely reported how doping and coating can help to improve the cycle stability of cathode materials, and ultimately improve the battery life. Unfortunately, many of these approaches cause a deterioration of the power capabilities. In particular doping by Zr, Mg, Al etc., as well as coating by phosphates, fluorites and oxides has been reported, but in many cases and quite generally this results in a lower power performance. The authors believe that this is related to a certain encapsulation effect which happens during doping or coating. The encapsulation prevents or limits the direct contact of the electrolyte with the charged LNMCO cathode surface, but at the same time it becomes more difficult for lithium to penetrate the encapsulating layer. Therefore it is essential to develop improved treated cathode materials which allow to improve the battery life without causing a reduction of power.

The doping of LNMCO materials with Zr is known from U.S. Pat. No. 8,343,662, where Zr is added in order to suppress the decline of the discharge voltage and capacity during charge-discharge cycles, and to improve cycle characteristics. Here a Li precursor and a coprecipitated Ni—

Mn—Co hydroxide are mixed with Zr-oxide, and the mixture is heated in air at 1000° C.

In U.S. Pat. No. 7,767,342 it is proposed to dope an oxide of a "dissimilar" element such as aluminum, silicon, titanium, vanadium and others in a lithium transition metal oxide, in order to improve the preservation characteristics of a battery by countering self discharge and increase of the internal resistance. For Ni—Mn—Co complex oxides expensive sintering methods are proposed:

A) mixing a Li-TM (transition metal)—oxide with an oxide of the "dissimilar" element, followed by sintering, B) mixing Li- and TM-precursors with a "dissimilar" element precursor, followed by sintering in air to oxidize the "dissimilar" element and intermix it in the Li-TM-oxide; or C) mixing a Li-TM-oxide with a precursor of the "dissimilar" element, followed by sintering under oxidizing conditions.

An example of prior art involving coating followed by a heat treatment is U.S. Pat. No. 8,007,941. A positive active material for a rechargeable lithium battery is disclosed, comprising: a core comprising at least one lithiated compound; and a surface-treatment layer on the core to form the positive active material, the surface-treatment layer comprising a coating material selected from the group consisting of non-lithium hydroxides or non-lithium oxyhydroxides, the coating material comprising a coating element selected from the group consisting of Sn, Ge, Ga, As, Zr, and mixtures thereof, and the coating material having an amorphous form. The material is pretreated by heating to 400° C. to 600° C., followed by heating to 700° C. to 900° C. for 10 to 15 hours to eliminate the carbon of the organic Al carrier.

Both coating with dopants selected from a long list, including Zr, and coating with a metal or metalloid oxide of LNMCO is disclosed in US2011/0076556. However, there is no indication why a dopant should be used, and the metal oxides can be either one of a long list including aluminum-, bismuth-, boron-, zirconium-magnesium-oxides (etc.). Also, the $Al_2O_3$ coating is obtained by a high temperature reaction of lithium metal oxide powder whereupon an aluminum hydroxide was precipitated. The extra heating step that is needed after a wet precipitation step to yield the aluminum oxide layer leads to the disadvantageous situation wherein the cathode and the coating layer form an intermediate gradient.

US2002/0192148 discloses a method for forming a lithium metal anode protective layer for a lithium battery having a cathode, an electrolyte, and a lithium metal anode sequentially stacked with the lithium metal anode protective layer between the electrolyte and the lithium metal anode, comprising: activating the surface of the lithium metal anode; and forming a LiF protective layer on the activated surface of the lithium metal anode. US2006/0275667 discloses a cathode active material comprising: complex oxide particle made of an oxide containing at least lithium (Li) and cobalt (Co); and a coating layer which is provided on at least part of the complex oxide particle and is made of an oxide containing lithium and at least one of nickel and manganese. US2005/0227147 discloses a positive electrode active material for a non-aqueous electrolyte secondary battery, comprising: a lithium nickel composite oxide containing lithium, nickel, and at least one metal element other than lithium and nickel; and a layer containing lithium carbonate, aluminum hydroxide, and aluminum oxide, said layer being carried on the surface of said lithium nickel composite oxide The present invention aims to provide improved lithium transition metal cathode materials for positive electrodes, made by a cheap process, and particularly suitable for automotive battery applications, especially in view of the DCR and the other problems cited before.

SUMMARY

Viewed from a first aspect, the invention can provide a lithium metal oxide powder for use as a cathode material in a rechargeable battery, consisting of Li metal oxide core particles having a general formula $Li_{1+d}(Ni_xMn_yCo_zZr_kM'_m)_{1-d}O_{2\pm e}A_f$; wherein $Al_2O_3$ is attached to the surface of the core particles; wherein $0 \leq d \leq 0.08$, $0.2 \leq x \leq 0.9$, $0 < y \leq 0.7$, $0 < z \leq 0.4$, $0 \leq m \leq 0.02$, $0 < k \leq 0.05$, $0 \leq e < 0.02$, $0 \leq f \leq 0.02$ and $x+y+z+k+m=1$; M' consisting of either one or more elements from the group Al, Mg, Ti, Cr, V, Fe and Ga; A consisting of either one or more elements from the group F, P, C, Cl, S, Si, Ba, Y, Ca, B, Sn, Sb, Na and Zn; and wherein the $Al_2O_3$ content in the powder is between 0.05 and 1 wt %. It is evident that the embodiment with $f=m=e=0$ forms part of the invention. In an embodiment $0.002 \leq k \leq 0.02$. In another embodiment the $Al_2O_3$ content in the powder is between 0.1 and 0.5 wt %. An advantageous feature of the invention is that the concentration of Zr in the powder is higher at the surface than in the bulk of the Li metal oxide core particles. In still another embodiment the median particle size D50 of the core particles is between 2 and 5 µm. In large dense particles the rate performance is limited by the longer Li diffusion path within the particle. Thus a significant part of the DCR resistance originates from the bulk diffusion. Contrary in small particles the Li diffusion path is shorter, thus the bulk sustains higher rates and therefore the DCR is more dominated by the surface charge transfer resistance. Therefore a surface modification to lower the charge transfer resistance promises a large benefit. The authors believe that the combination of Alumina coating and Zr doping gives the biggest benefit if the particles are small.

In various embodiments, $Al_2O_3$ is attached to the surface of the core particles as a discontinuous coating. The attached $Al_2O_3$ may be in the form of a plurality of discrete particles having a d50<100 nm. In one embodiment, $Al_2O_3$ is at least partly removably attached to the surface of the core particles by a dry-coating process.

In still other embodiments, $0 < x-y < 0.4$ and $0.1 < z < 0.4$. In various embodiments either each one of x, y and z is equal to $0.33 \pm 0.03$, and $0.04 < d < 0.08$; or $x=0.40 \pm 0.03$, $y=0.30 \pm 0.03$, $z=0.30 \pm 0.03$ and $0.04 < d < 0.08$; or $x=0.50 \pm 0.03$, $y=0.30 \pm 0.03$, $z=0.20 \pm 0.03$ and $0.02 < d < 0.05$; or $x=0.60 \pm 0.03$, $y=0.20 \pm 0.03$, $z=0.20 \pm 0.03$ and $0 < d < 0.03$. In general an embodiment of the invention may be where $0.3 \leq x \leq 0.6$, $0.2 \leq y \leq 0.4$, $0.2 \leq z \leq 0.4$ with $0 < d \leq 0.08$. This embodiment may be combined with another embodiment where $0.002 \leq k \leq 0.02$ and the $Al_2O_3$ content is between 0.1 and 0.5 wt %.

It is clear that further product embodiments according to the invention may be provided with features that are covered by the different product embodiments described before.

Viewed from a second aspect, the invention can provide a process of preparing the lithium metal oxide powder according to the invention, the powder consisting of Li metal oxide core particles and $Al_2O_3$ attached to the surface of the core particles, comprising the steps of:

providing $Al_2O_3$ powder having a volume V1, the $Al_2O_3$ powder being a nanometric non-agglomerated powder;

providing the Li metal oxide core material, having a volume V2;

mixing the $Al_2O_3$ powder and the Li metal oxide core material in a dry-coating procedure, thereby covering the Li metal oxide core material with $Al_2O_3$ particles.

During the step of mixing the $Al_2O_3$ powder and the Li metal oxide core material in a dry-coating procedure, the volume V1+V2=Va decreases, until the volume remains constant at a value Vb, thereby covering the Li metal oxide core material with $Al_2O_3$ particles. It is this typical process that provides the advantages of the products according to the invention, as will become clear in Counterexample 1.

Viewed from a third aspect, the invention can provide the use of the lithium metal oxide powder according to the invention in a mixture comprising the lithium metal oxide powder and another lithium transition metal oxide based powder having a median particle size D50 of more than 5 μm.

Viewed from a fourth aspect, the invention can provide a battery comprising a cathode material comprising the lithium metal oxide powder according to to the invention, wherein the battery is used in an automotive application. In one embodiment this battery is a battery of a hybrid electric vehicle.

DETAILED DESCRIPTION

Figure 1:
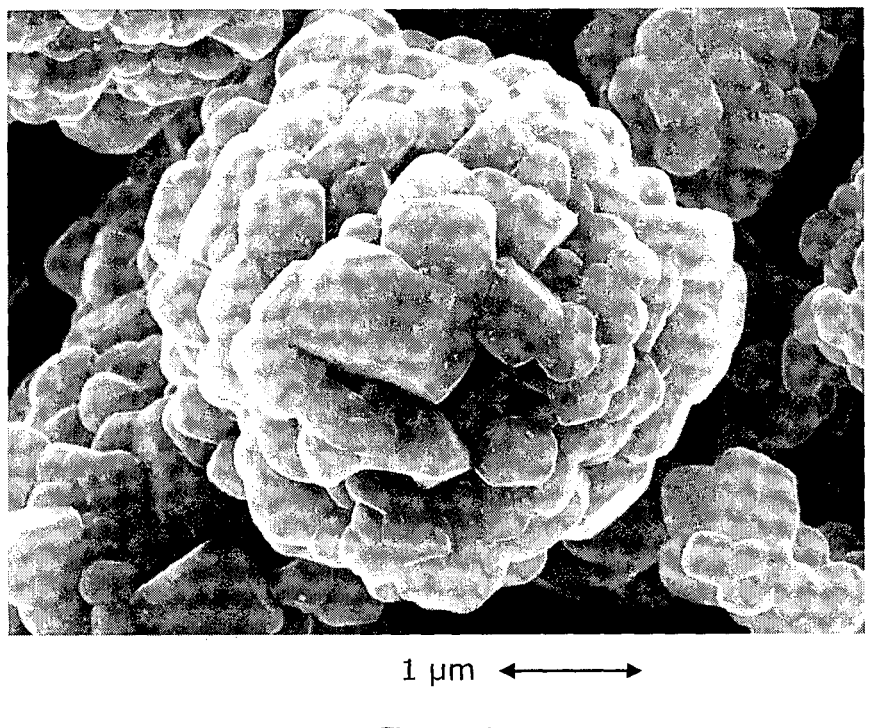
FIG. 1: SEM image of Al-coated+Zr-doped NMC433

The invention provides cathode materials which have lower DCR values, and thus can be preferably applied as cathode materials for HEV or PHEV batteries. Of course their use as cathodes for conventional high power application (fx. power tools) is also within the scope of the current invention. Furthermore cathode materials of the present invention can be mixed with other cathode materials having a higher D50, with the primary goal to improve the power and DCR resistance of the latter, and in so doing to fine-tune the cathode mixture according to the desired end-use.

The authors discovered a surprising synergistic effect when (1) doping a NMC base cathode material with Zr and then (2) applying an $Al_2O_3$ coating onto the Zr doped cathode material. Zr doping can help to significantly improve the cycle stability of NMC based cathode materials. This effect is at least partially related to a surface modification.

The Zr doped Li metal oxide core particles may be prepared as follows:

(a) a precursor comprising Zr, for example $ZrO_2$, is mixed with a lithium- and a Ni—Mn—Co-precursor having the desired final NMC composition. The precursors are put in a vessel. The precursors are blended in a vertical single-shaft mixer by a dry powder mixing process, (b): sintering in an oxidizing atmosphere. The powder mixture from step (a) is sintered in a tunnel furnace in an oxidizing atmosphere. The sintering temperature is >900° C. and the dwell time is ~10 hrs. Dry air is used as an oxidizing gas, (c): after sintering, the sample is milled in a grinding machine to the desired particle size distribution.

Data have shown that the thermodynamic doping limit of Zr in NMC cathode is very small. Thus only a small amount of Zr is present in the bulk and there is an accumulation of excess Zr near to the surface, and possibly at the grain boundaries. This Zr possibly protects the surface from excessive parasitary reactions with electrolyte, and possibly the grain boundaries are more robust against mechanical strain during fast cycling.

Furthermore, the authors discovered that $Al_2O_3$ nanoparticle coating of NMC surfaces often has a mildly positive effect to improve DCR and increase cycle stability. The $Al_2O_3$ coating of NMC applies aluminum oxide nanoparticles to the surface of the cathode. It is not desired that the cathode and the coating layer form an intermediate gradient which typically is the case if a heat treatment at higher temperature is applied to the NMC-$Al_2O_3$ composition. A gradient is achieved when some aluminum chemically attaches to the surface or diffuses into the outer parts of the cathode, and some Li diffuses onto or into the aluminum to form $LiAlO_2$, as in U.S. Pat. No. 8,007,941 and US2011/0076556. Contrary to this, it is beneficial that the $Al_2O_3$ nanoparticles are mechanically and removably attached, i.e. relatively loosely attached to the surface. These nanoparticles contribute to an increase in Brunauer-Emmett-Teller (BET) surface area of the cathode material, without increasing the surface area of the NMC itself.

When applying an $Al_2O_3$ nanoparticle coating to the surface, of Zr doped NMC the authors discovered a quite strong synergistic effect. In all cases the general properties (cycle stability and DCR power) were the best compared to Zr doped (but not alumina coated) or alumina coated (but not Zr doped) references. Moreover, the obtained doped and coated materials had much better properties compared to the expected additive results. Particularly, whereas Zr doping without alumina coating causes less power than undoped NMC, Zr doping with alumina coating shows the best results, even better than the undoped and alumina coated NMC. Also the cycle stability of Zr doped and $Al_2O_3$ coated cathodes is much better than expected compared to only Zr doped or only alumina coated NMC. The authors can only speculate why $Al_2O_3$ improves the DCR of Zr doped NMC that much. It is possible that the presence of high surface area (alumina-)oxide at the surface—possibly by the dielectric properties—facilitates the charge transfer reaction.

The Examples will show results for 3-4 µm LNMCO materials. Small particle size cathodes are chosen to demonstrate how such known high power cathode materials can be further improved. Whereas small particle LNMCO is a natural choice, the embodiments of the current invention are not limited to LNMCO with a small particle size distribution (PSD). Larger particle size LNMCO's, having a BET surface area which is sufficiently high, are within the scope of the current invention.

The Examples also use a cathode material that has a relatively high Li:M ratio. In $Li_{1+x}M_{1-x}O_2$ the value for the lithium excess "x" is about 0.06 for NMC111. Li excess reduces cation mixing (i.e. Ni located on Li layers in the layered crystal structure) and thus—since Ni in the Li layer blocks Li diffusion paths—supports high power. Cathode materials having an excess of Li "x" are a natural choice, however the different embodiments of the current invention are not limited to a particular Li excess value of x.

The examples furthermore use a transition metal composition near to $M=Ni_{1/3}Mn_{1/3}Co_{1/3}$ (NMC111) or $M=Ni_{0.38}Mn_{0.29}Co_{0.33}$ (NMC433). These compositions are known to be "robust": because the Ni:Mn ratio is near to unity the cathodes have a high air stability and a relatively low soluble base content, and their preparation is straightforward. The concept of soluble base content is e.g. described in WO2012/107313. The relatively high Co content supports a well layered crystal structure and thereby promises high power capabilities. Cathode materials having a Ni:Mn near to or slightly larger than unity, as well as a high Co content, are a natural choice, however the different embodiments of the current invention are not limited to this Ni:Mn value and cobalt content.

Conclusion: in various embodiments the current invention might be applied to many different sized particles having different Li:M stoichiometries and metal compositions M. Besides the exemplified NMC111 and 3-4 µm $Li_{1+x}M_{1-x}O_2$ with x=0.08 and $M=Ni_{0.38}Mn_{0.29}Co_{0.33}$, cathodes with larger particles, less Co and higher Ni:Mn can be implemented. For example, a 5 µm LNMCO powder with cathode composition NMC=532 and x=0.03; or an 8 µm LNMCO powder with cathode composition M=622 and x=0.01 are embodiments of the invention, as long as the powder is Zr doped and coated by $Al_2O_3$ nanoparticles.

A DCR test does not yield a single value, but its value is a function of the battery's state of charge (SOC). For LNMCO cathodes, the DCR increases at low state of charge whereas it is flat or shows a minimum value at a high state of charge. A high state of charge refers to a charged battery, a low state of charge is a discharged battery. The DCR strongly depends on temperature. Especially at low temperature the cathode contribution to the DCR of the cell becomes dominating, hence low T measurements are quite selective to observe improvements of DCR that are directly attributable to the behaviour of the cathode materials. In the examples, DCR results of cathodes of real full cells using materials according to the invention are reported. Typically the SOC is varied from 20 to 90%, and the tests are performed at representative temperatures of 25° C. and −10° C.

Automotive batteries are expensive and therefore, they are supposed to last for many years. Severe requirements have to be met by the cathode materials. Here we will summarize these requirements as "battery life" requirements, since battery life is not one simple property. In real life batteries are stored at different states of charge (during driving or during parking), and during driving, they are charged and discharged at different temperatures as well as different voltages. For development purposes it is impossible to test cells for many years under realistic conditions. To speed up the tests "accelerated life" tests are applied, which investigate different mechanisms that contribute to a limited shelf-life.

Batteries are for example tested at constant charging and discharging rate, to measure the "cycle stability". Cycle stability can be tested under different voltage ranges, temperatures and current rates. Under these different conditions different mechanisms which cause a capacity loss can be observed. For example, slow cycling at high T mostly expresses the chemical stability, while fast cycling at low temperature shows dynamic aspects. The cycle stability results for cathodes in real full cells—made according to the invention—are reported further on. The tests are performed at a voltage range of 2.7-4.2V, at a temperature of 45° C. and at a 1 C charge-1 C discharge rate.

Storage tests investigate the capacity loss after extended storage (by measuring the remaining or retention capacity), and also the recovered capacity measured after recharging. Additionally, the resistance is measured and compared to the initial value. The increase of the resistance is an important result of cell damage during storage, since it directly influences power capabilities. DCR measurements are also a very sensitive tool to detect (and extrapolate) to what degree undesired side reactions have happened (or will happen) in the cell during storage. To accelerate the tests, the storage is done at high voltage (where the cell is initially fully charged at 4.2V) and at a higher temperature of 60° C., which accelerates the undesired side reactions. However, the testing of capacities and DCR after storage is typically done at room temperature. The results of storage tests are reported further on, showing recovered capacity and retention capacity, measured at 25° C. after storage at 60° C. DCR measurement results after storage are also reported, and graphs will show the relative value compared to the DCR measurements before storage.

Particulate lithium transition metal oxide core materials may be coated with alumina using several coating procedures. The alumina can be obtained by precipitation, spray drying, milling, etc. In one embodiment the alumina typically has a BET of at least 50 $m^2/g$ and consists of primary particles having a d50<100 nm, the primary particles being non-aggregated. In another embodiment fumed alumina or surface treated fumed alumina is used. Fumed alumina nanoparticles are produced in high temperature hydrogen-air flames and are used in several applications that involve products of every day use. The crystalline structure of the fumed alumina is maintained during the coating procedures and is therefore found in the coating layer surrounding the $LiMO_2$ core. This latter method is the easiest and cheapest method for applying alumina particles on the NMC core.

The invention will now be illustrated in the following examples:

EXAMPLE 1

This example demonstrates that the Al-coated plus Zr-doped NMC433 cathode material delivers the best power performance compared to the pristine, only Al coated and only Zr-doped materials. NMC 433 stands for $Li_{1.08}M_{0.92}O_2$, with $M=Ni_{0.38}Mn_{0.29}Co_{0.33}O_2$.

NMC 433 preparation: The doped and coated NMC433 was manufactured on a pilot line of Umicore (Korea), by the following steps: (a) Blending of lithium and Nickel-Manganese-Cobalt precursors and Zr oxide; (b) Synthesizing in an oxidizing atmosphere; (c) Milling and (d) Alumina dry-coating. The detailed explanation of each step is as follows:

Step (a): Blending of $ZrO_2$, a lithium- and a Ni—Mn—Co-precursor having the desired final 433 composition using a dry powder mixing process, aiming at a molar ratio for $ZrO_2$ of 1 mol %. The precursors are put in a vessel. The $ZrO_2$ particles are in tetragonal and monoclinic phases, and have an average primary particle size of 12 nm and a BET of 60±15 $m^2/g$. They are mixed with lithium carbonate and mixed Ni—Mn—Co oxy-hydroxide which are the lithium and Ni—Mn—Co precursors. The precursors are blended in a vertical single-shaft mixer by a dry powder mixing process.

Step (b): sintering in an oxidizing atmosphere. The powder mixture from step (a) is sintered in a tunnel furnace in an oxidizing atmosphere. The sintering temperature is >900° C. and the dwell time is ~10 hrs. Dry air is used as an oxidizing gas.

Step (c): after sintering, the sample is milled in a grinding machine to a particle size distribution with D50=3-4 μm. The span is 1.20. Span is defined as (D90-D10)/D50 where DXX are the corresponding XX values of the volume distribution of the particle size analysis.

Step (d): 1 kg of a NMC433 is filled into a mixer (for example a 2L Henschel type Mixer) and 2 g of fumed alumina ($Al_2O_3$) nano-powder is added. During mixing for 30 min at 1000 rpm the fumed alumina slowly fades out of sight and a coated NMC powder, looking very much like the initial powder results. With this ratio of quantities precursor/fumed alumina a coating level of aluminum of 0.3625 mol % is achieved (which corresponds to 0.1 wt % aluminum or about 0.2 wt % alumina). Further analysis shows that the alumina is loosely or removably attached to the surface, a large fraction of the alumina particles can indeed be separated from the core by a suitable wash with water.

FIG. 1 shows a SEM image of Al-coated+Zr-doped NMC 433 according to the invention. The lithium metal oxide powder consists of agglomerated submicron-sized crystallites. The presence of discrete particles (or nanometric islands) of alumina on the surface is clear.

Slurry Making and Coating

A slurry is prepared by mixing 700 g of the doped and coated NMC 433 with NMP, 47.19 g of super P® (conductive carbon black of Timcal) and 393.26 g of 10 wt % PVDF based binder in NMP solution. The mixture is mixed for 2.5 hrs in a planetary mixer. During mixing additional NMP is added. The mixture is transferred to a Disper mixer and mixed for 1.5 hrs under further NMP addition. A typical total amount of NMP used is 423.57 g. The final solid content in the slurry is about 65 wt %. The slurry is transferred to a coating line. Double coated electrodes are prepared. The electrode surface is smooth. The electrode loading is 9.6 $mg/cm^2$. The electrodes are compacted by a roll press to achieve an electrode density of about 3.2 $g/cm^3$. The electrodes are used to prepare pouch cell type full cells as described hereafter.

Full Cell Assembly

For full cell testing purposes, the prepared positive electrodes (cathode) are assembled with a negative electrode (anode) which is typically a graphite type carbon, and a porous electrically insulating membrane (separator). The full cell is prepared by the following major steps: (a) electrode slitting, (b) electrode drying, (c) jellyroll winding, and (d) packaging.

(a) electrode slitting: after NMP coating the electrode active material might be slit by a slitting machine. The width and length of the electrode are determined according to the battery application.

(b) attaching the taps: there are two kinds of taps. Aluminum taps are attached to the positive electrode (cathode), and copper taps are attached to the negative electrode (anode).

(c) electrode drying: the prepared positive electrode (cathode) and negative electrode (anode) are dried at 85° C. to 120° C. for 8 hrs in a vacuum oven.

(d) jellyroll winding: after drying the electrode a jellyroll is made using a winding machine. A jellyroll consists of at least a negative electrode (anode) a porous electrically insulating membrane (separator) and a positive electrode (cathode).

(e) packaging: the prepared jellyroll is incorporated in a 360 mAh cell with an aluminum laminate film package, resulting in a pouch cell. Further, the jellyroll is impregnated with the electrolyte. The quantity of electrolyte is calculated in accordance with the porosity and dimensions of the positive electrode and negative electrode, and the porous separator. Finally, the packaged full cell is sealed by a sealing machine.

The DCR resistance is obtained from the voltage response to current pulses, the procedure used is according to the USABC standard mentioned before. The DCR resistance is very relevant for practical application because data can be used to extrapolate fade rates into the future to prognose battery life, moreover DCR resistance is very sensitive to detect damage to the electrodes, because reaction products of the reaction between electrolyte and anode or cathode precipitate as low conductive surface layers.

The procedure is as follows: the cells are tested by hybrid pulse power characterization (HPPC) to determine the dynamic power capability over the device's useable voltage range, using a test profile that incorporates 10 sec charge and 10 sec discharge pulses at each 10% stage of charge (SOC) step. In the current invention, the HPPC tests are conducted at both 25° C. and −10° C. The testing procedure of 25° C. HPPC is as follows: a cell is first charged-discharged-charged between 2.7~4.2V under CC/CV (constant current/constant voltage) mode at 1 C rate (corresponding to the current which discharges a charged cell within 1 hr). Afterwards, the cell is discharged under CC mode at 1 C rate to 90% SOC, where 10 second discharge at 6 C rate (corresponding to the current which discharges a charged cell within ⅙ hr) is applied followed by 10 second charge at 4 C rate. The differences in voltage during pulse discharge and pulse charge are used to calculate the discharge and charge direct current resistance (DCR) at 90% SOC. The cell is then discharged at 1 C rate to different SOC's (80%~20%) step by step and at each SOC, 10s HPPC tests are repeated as described above. The HPPC tests at −10° C. uses basically the same protocol as testing at 25° C., except that the 10 second discharge pulse is performed at 2 C rate and the 10 second charge pulse is performed at 1 C rate. To avoid the influence of self-heating of the cell on the cell temperature during charge and discharge, a fixed relaxation time is applied after each charge and discharge step. The HPPC tests are conducted on two cells of each cathode material at each temperature and the DCR results are averaged for the two cells and plotted against the SOC. Basically, a lower DCR corresponds to a higher power performance.

Figure 2:
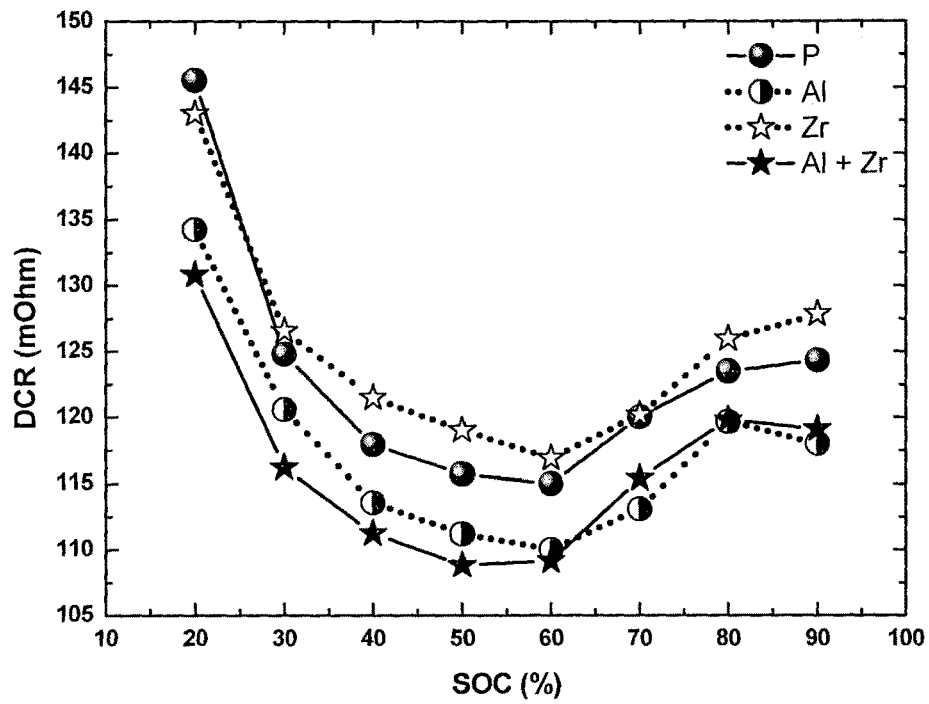
FIG. 2: Direct current resistance (DCR) measured by hybrid pulse power characterization at 25° C. at different state of charge (SOC) for a series of NMC433 materials: pristine (P), Al-coated (Al), Zr-doped (Zr) and Al coated+Zr-doped (Al+Zr).
Figure 3:
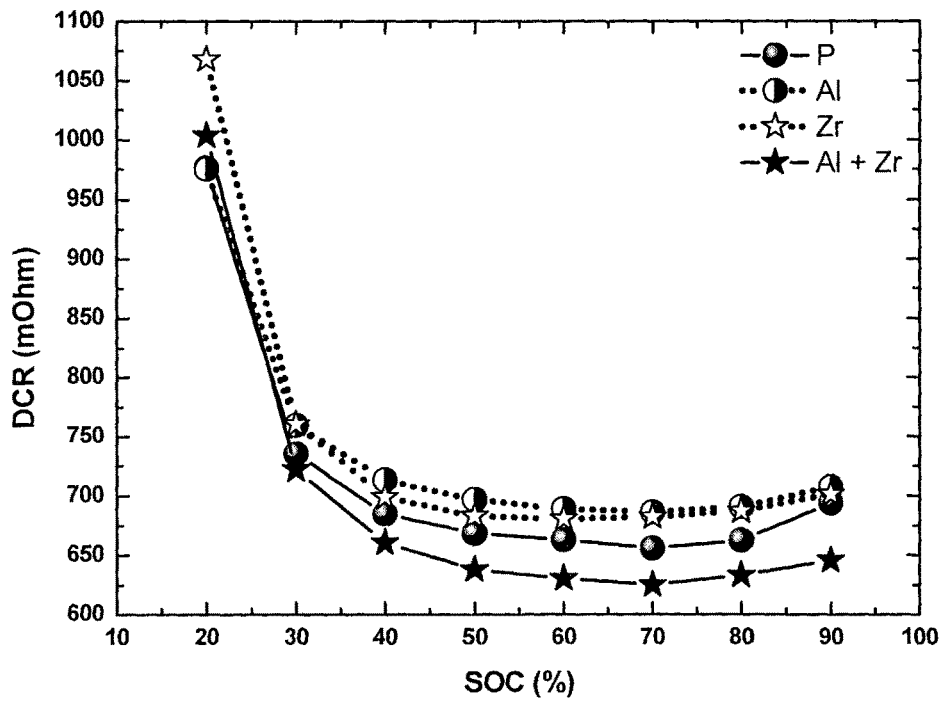
FIG. 3: Direct current resistance (DCR) measured by hybrid pulse power characterization at −10° C. at different state of charge (SOC) for NMC433 materials: pristine (P), Al-coated (Al), Zr-doped (Zr) and Al coated+Zr-doped (Al+Zr)

FIG. 2 illustrates the DCR results of a series of NMC433 cells measured at 25° C.: pristine, Al-coated, Zr-doped and Al-coated+Zr-doped. Compared to the pristine, the Al-coated cathode delivers in the full SOC range a smaller DCR, hence yielding a better power performance. The Zr-doped cathode results in a generally higher DCR. So the power performance is inferior to the pristine. However, surprisingly, a combination of Al coating and Zr doping gives the best DCR and power performance. FIG. 3 shows the DCR results of the same series of NMC433 cells measured at −10° C. Although only Al-coated and only Zr-doped materials shows higher DCR values than the pristine material, surprisingly, the Al-coated plus Zr-doped material still gives the best DCR and power performance of all the materials.

EXAMPLE 2

Figure 4:
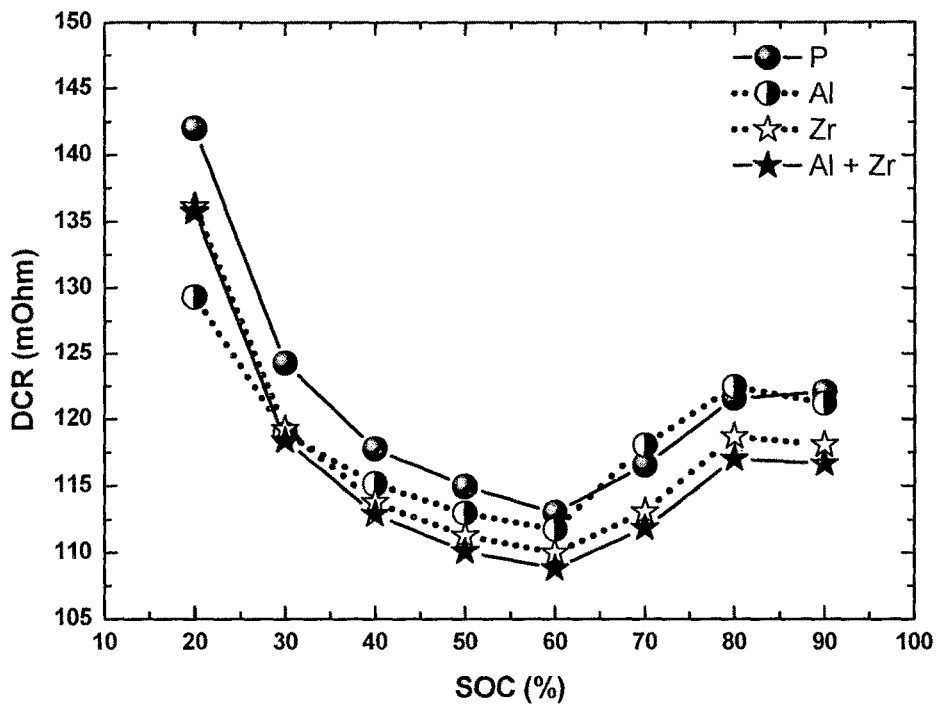
FIG. 4: Direct current resistance (DCR) measured by hybrid pulse power characterization at 25° C. at different state of charge (SOC) for a series of NMC111 materials: pristine (P), Al-coated (Al), Zr-doped (Zr) and Al coated+Zr-doped (Al+Zr)
Figure 5:
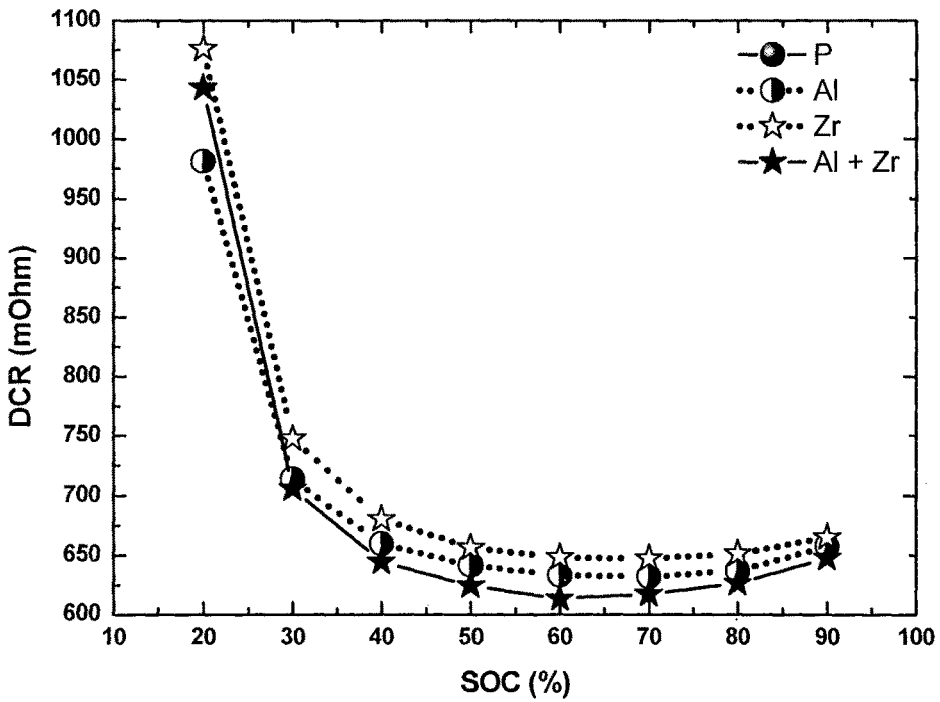
FIG. 5: Direct current resistance (DCR) measured by hybrid pulse power characterization at −10° C. at different state of charge (SOC) for a series of NMC111 materials: pristine (P), Al-coated (Al), Zr-doped (Zr) and Al coated+Zr-doped (Al+Zr)

In this Example NMC111 material is prepared and integrated in a full cell using the same method as in Example 1. The powder has a D50 of 3-4 μm, and a Li/M ratio of 1.13 (corresponding to $Li_{1.06}M_{0.94}O_2$). The content of Zr and Al is also the same: 1 mol % $ZrO_2$ and 0.2 wt % alumina. The Example confirms the same effect in cathode material NMC111 as observed in Example 1: the combination of Al coating and Zr doping delivers the lowest DCR and thus the best power performance compared to pristine, only Al-coated or only Zr-doped materials. The HPPC testing conditions are the same as described in Example 1, and the DCR results at 25° C. and −10° C. are shown in FIG. 4 and FIG. 5, respectively.

EXAMPLE 3

This Example demonstrates that the Al-coated+Zr-doped NMC433 cathode material of Example 1 delivers the best cycle life at 45° C. compared to the pristine, the only Al coated and the only Zr-doped materials. For a positive cathode material used in electric vehicles which will probably be charged and discharged for at least a thousand times, it is very important to have a long cycle life corresponding to a good cycle stability. To estimate the cycle life of the cathode material within a short period in the lab, the 360 mAh pouch cell is cycled between 2.7~4.2 V at both charge and discharge rate of 1 C. CC/CV mode is applied during charging while CC mode is used during discharging. The cycling is conducted in a 45° C. chamber, in order to simulate the worst condition, and to differentiate between cells. Both the difference in cathode materials and cell variation during preparation may lead to a difference in pouch cell capacity. All the cell capacities are normalized to the discharge capacity of the second cycle QD2.

Figure 6:
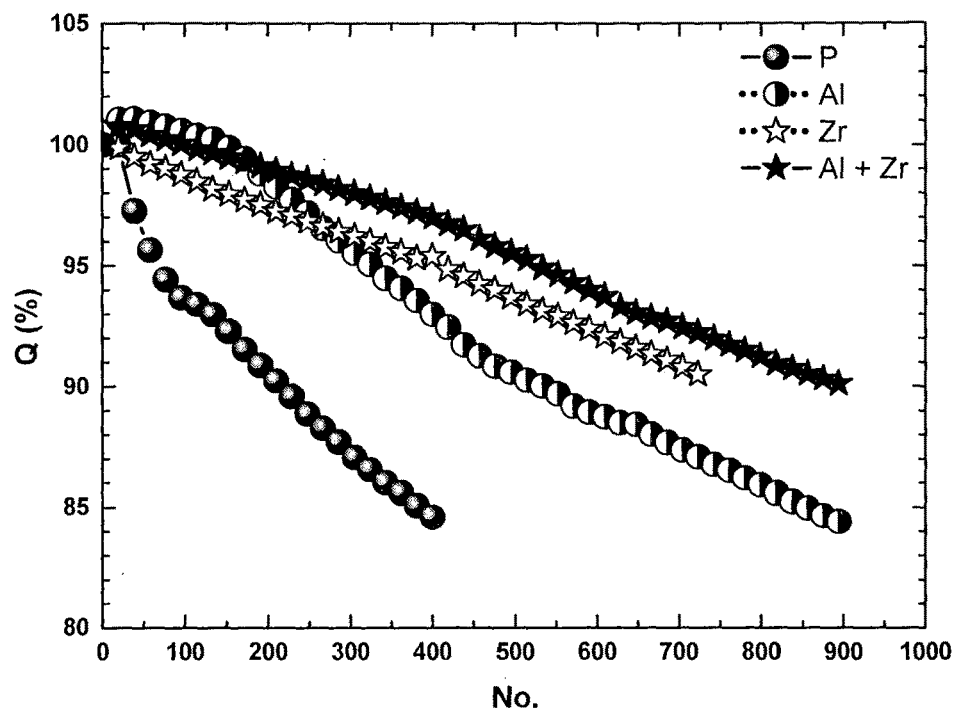
FIG. 6: Cycle life of 360 mAh cells at 4.2V measured at 45° C. at 1 C charge and discharge rate for a series of NMC433 materials: pristine (P), Al-coated (Al), Zr-doped (Zr) and Al coated+Zr-doped (Al+Zr)

The plot of the cycle life is shown in FIG. 6. The cycle life of the pristine is the worst among the series of materials. The only Al-coated material improves the cycle life a little while the only Zr-doped material improves the cycle life more. The combination of Al-coating and Zr-doping delivers the best cycle life, a result that could not have been predicted based on the results of the Zr doped and the Al coated material.

EXAMPLE 4

Figure 7:
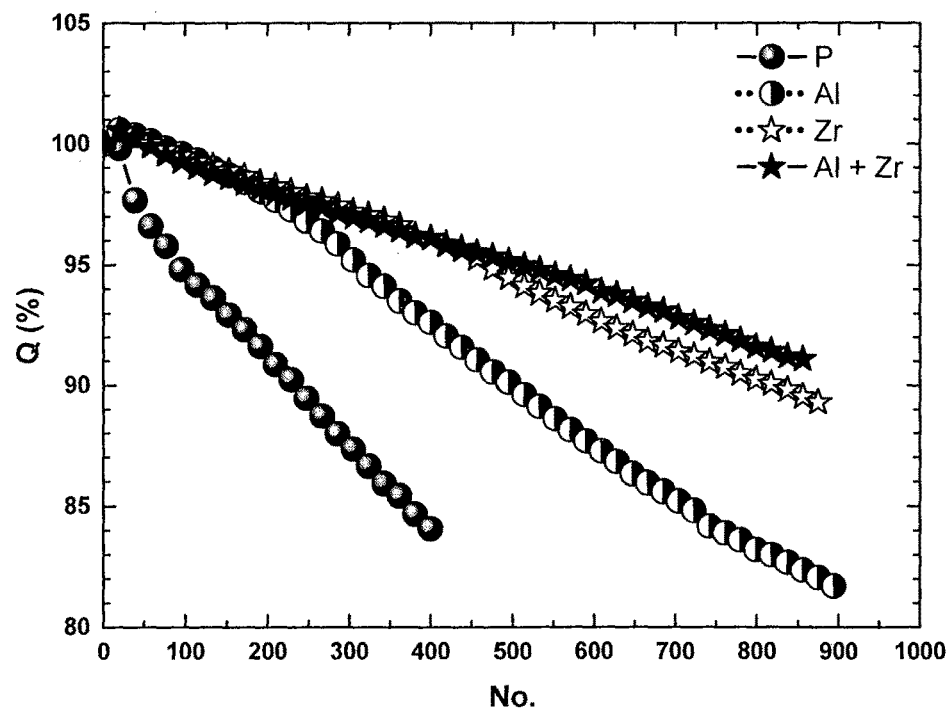
FIG. 7: Cycle life of 360 mAh cells at 4.2V measured at 45° C. at 1 C charge and discharge rate for a series of NMC333 materials: pristine (P), Al-coated (Al), Zr-doped (Zr) and Al coated+Zr-doped (Al+Zr)

This Example confirms the same effect in cathode material NMC111 of Example 2 as observed in Example 3: the combination of Al coating and Zr doping leads to the best cycle life at 45° C. (same test as in Ex. 3) compared to pristine, only Al-coated and Zr-doped materials. The cycle life testing conditions are all the same as described in Example 3. As shown in FIG. 7, the cycle life of the pristine is the worst among the series of materials. Both Al coating and Zr doping improve the cycle life of NMC111. The best and again unpredicted improvement results from a combination of both Al coating and Zr doping.

EXAMPLE 5

This Example demonstrates that the Al-coated plus Zr-doped NMC433 cathode material of Example 1 delivers the best retention capacity, the best recovery capacity and the smallest=best DCR increase during 60° C. storage tests compared to the pristine, only Al coated and only Zr-doped materials.

For a positive cathode material used in electric vehicles which are expected to be used as long as comparable gas powered vehicles, it is crucial to have a long calendar life. To investigate the calendar life behaviour and be able to distinguish between cells within a short testing period, the 360 mAh cell is stored at 60° C. in a chamber for three months. After each month of storage, the cell is taken out of the chamber to check the retention capacity. Then the cell is first discharged to 2.7 V under CC mode and then charged to 4.2 V to check the recovery capacity. The DCR is also measured at 3 V during discharge. To make a fair comparison between different cells, all the measured capacity and DCR data are normalized to the initial capacity and initial DCR.

Figure 8:
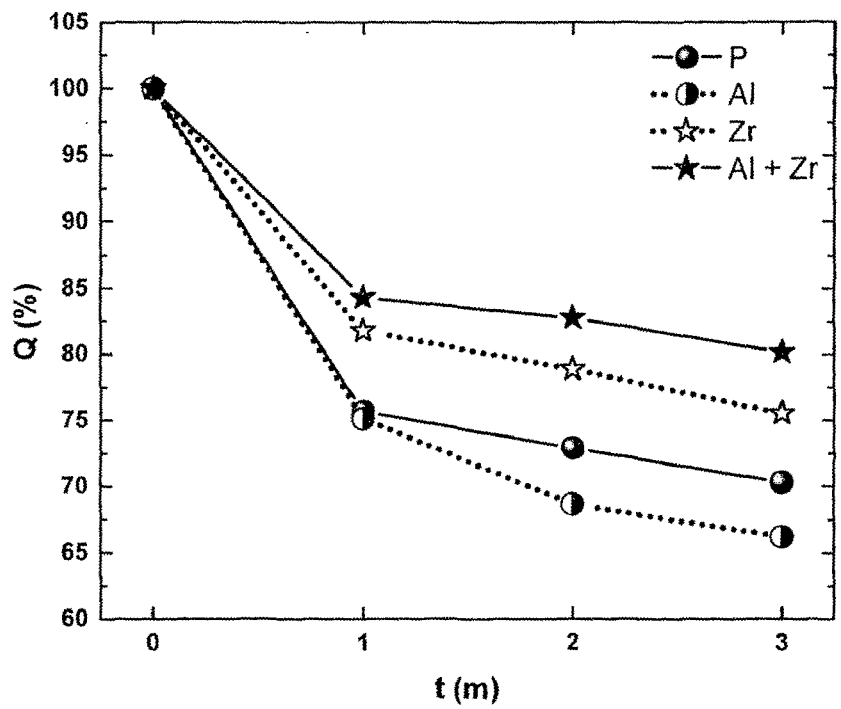
FIG. 8: Retention capacity ($Q_{ret}$) measured monthly during 60° C. storage test on 360 mAh cells of a series of NMC433 materials: pristine (P), Al-coated (Al), Zr-doped (Zr) and Al coated+Zr-doped (Al+Zr) (m stands for month)
Figure 9:
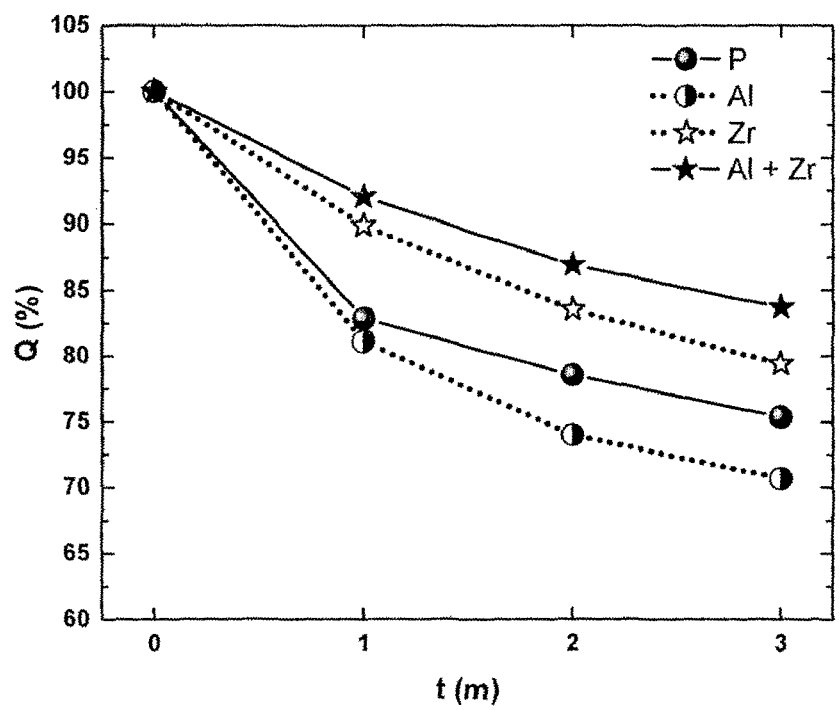
FIG. 9: Recovery capacity ($Q_{rec}$) measured monthly during 60° C. storage test on 360 mAh cells of a series of NMC433 materials: pristine (P), Al-coated (Al), Zr-doped (Zr) and Al coated+Zr-doped (Al+Zr) (m stands for month)
Figure 10:
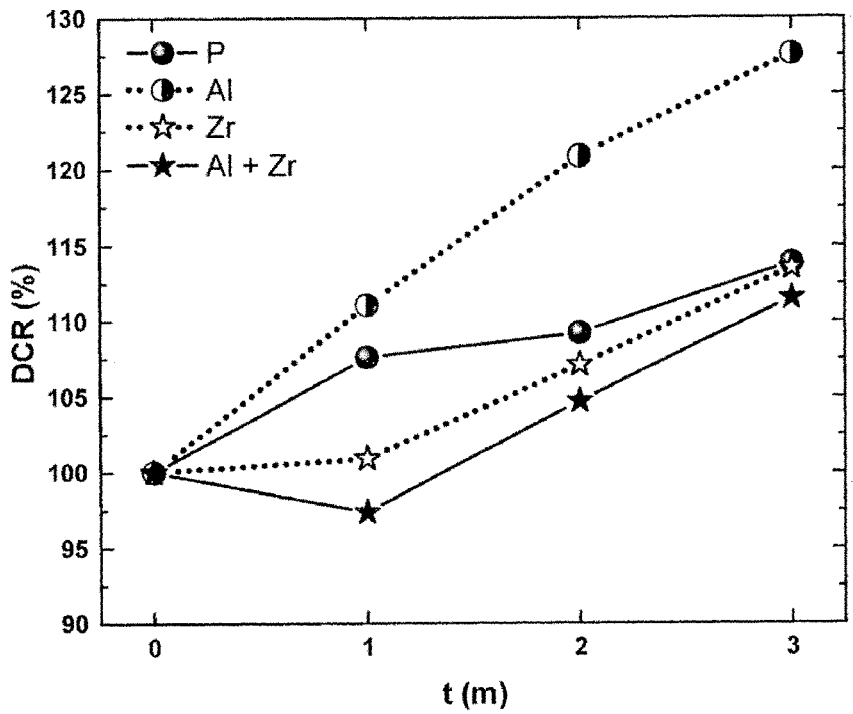
FIG. 10: Growth of direct current resistance (DCR) measured monthly during 60° C. storage test on 360 mAh cells of a series of NMC433 materials: pristine (P), Al-coated (Al), Zr-doped (Zr) and Al coated+Zr-doped (Al+Zr) (m stands for month)

FIG. 8 shows the normalized retention capacity ($Q_{ret}$) plot of 360 mAh cells made by a series of NMC433 materials. The retention capacity of the pristine material decreases quickly over time. The only Al-coated material does not improve the performance and even worsens it after two months. The only Zr-doped material improves the retention capacity. And surprisingly the combination of Al coating+Zr doping further improves it. FIG. 9 illustrates the effect of the Al coating+Zr doping on the recovery capacity ($Q_{rec}$) in the storage test. The trend is the same as for the retention capacity. FIG. 10 plots the normalized DCR value against time. The DCR increases fast during storage, especially for the pristine and the only Al-coated material. The only Zr-doped material slows down the DCR increase but the Al coating+Zr doped material further improves it. To summarize, the combination of Al coating and Zr doping results in the best performance during a storage test at 60° C.

EXAMPLE 6

Figure 11:
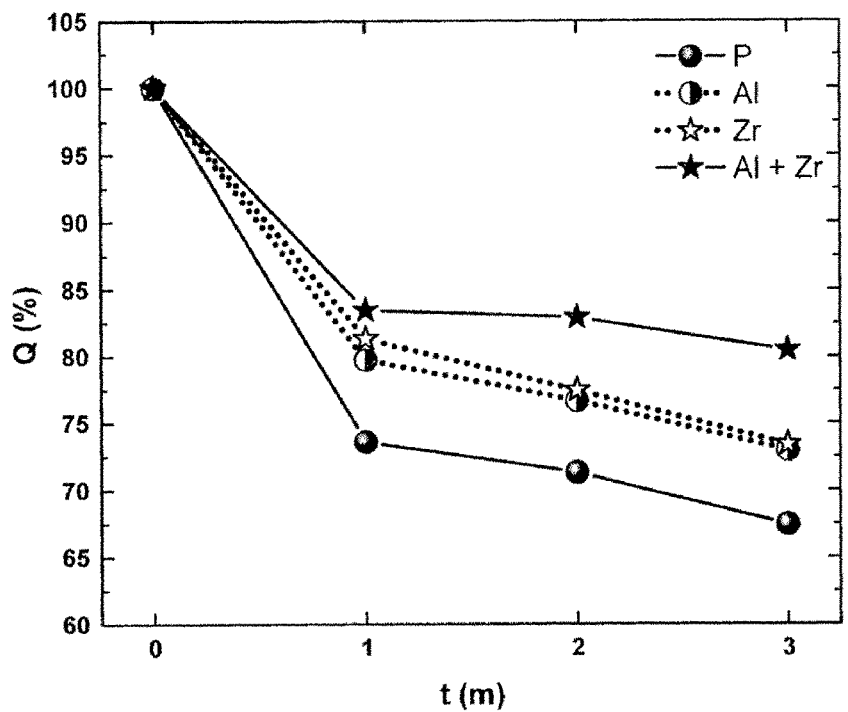
FIG. 11: Retention capacity ($Q_{ret}$) measured monthly during 60° C. storage test on 360 mAh cells of a series of NMC111 materials: pristine (P), Al-coated (Al), Zr-doped (Zr) and Al coated+Zr-doped (Al+Zr) (m stands for month)
Figure 12:
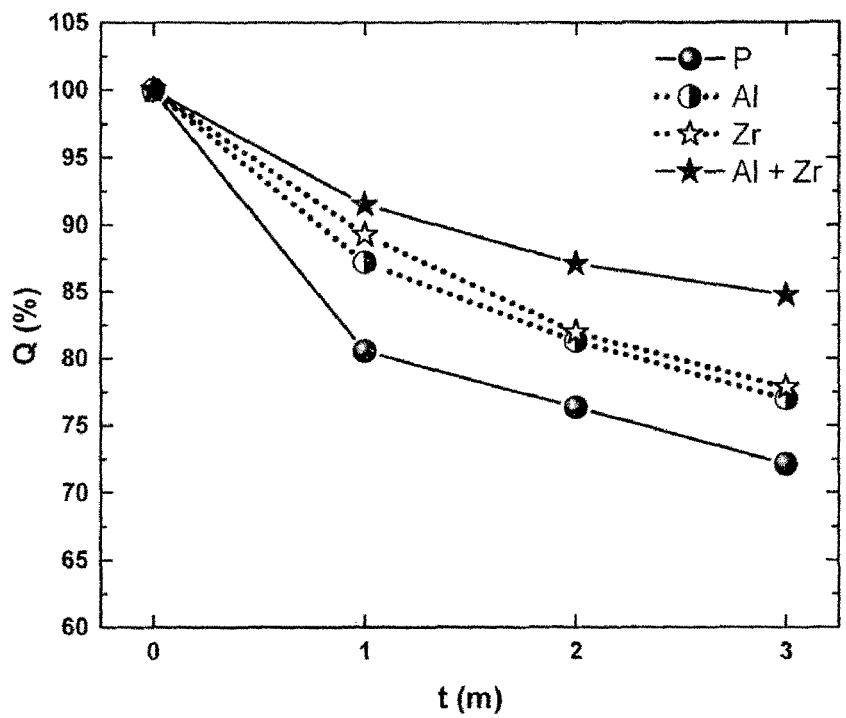
FIG. 12: Recovery capacity ($Q_{rec}$) measured monthly during 60° C. storage test on 360 mAh cells of a series of NMC111 materials: pristine (P), Al-coated (Al), Zr-doped (Zr) and Al coated+Zr-doped (Al+Zr) (m stands for month)
Figure 13:
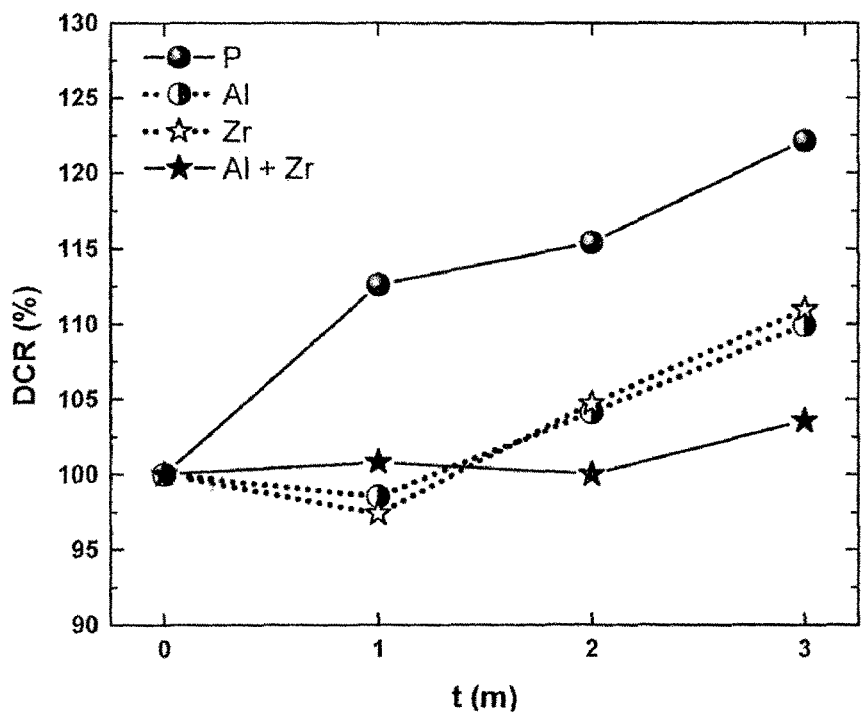
FIG. 13: Growth of direct current resistance (DCR) measured monthly during 60° C. storage test on 360 mAh cells of a series of NMC111 materials: pristine (P), Al-coated (Al), Zr-doped (Zr) and Al coated+Zr-doped (Al+Zr) (m stands for month)

This Example confirms the same effect in cathode material NMC111 of Example 2 as observed in Example 5: the combination of Al coating and Zr doping gives the best retention capacity (in FIG. 11), the best recovery capacity (in FIG. 12) and the best DCR increase (in FIG. 13) during storage test at 60° C. compared to pristine, only Al-coated and Zr-doped materials. The temperature storage testing conditions are the same as described in Example 5.

COUNTEREXAMPLE 1

Figure 14:
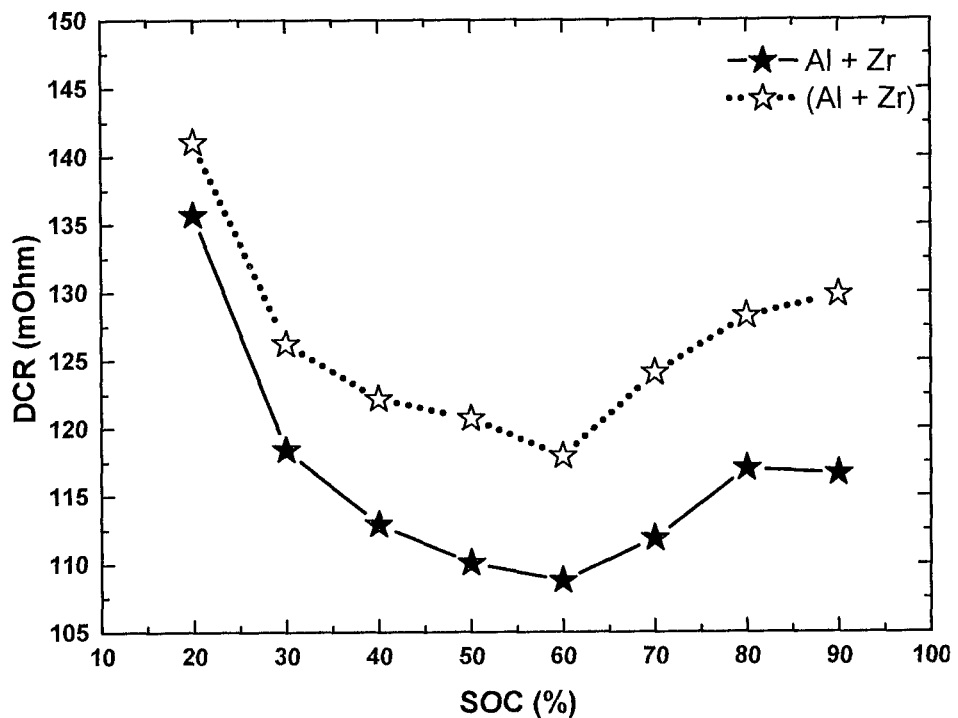
FIG. 14: Direct current resistance (DCR) measured by hybrid pulse power characterization at 25° C. at different state of charge (SOC) for NMC111: Al coated+Zr-doped according to the invention (-★-) vs. Zr-doped and Al coated followed by heat treatment (••☆••)
Figure 15:
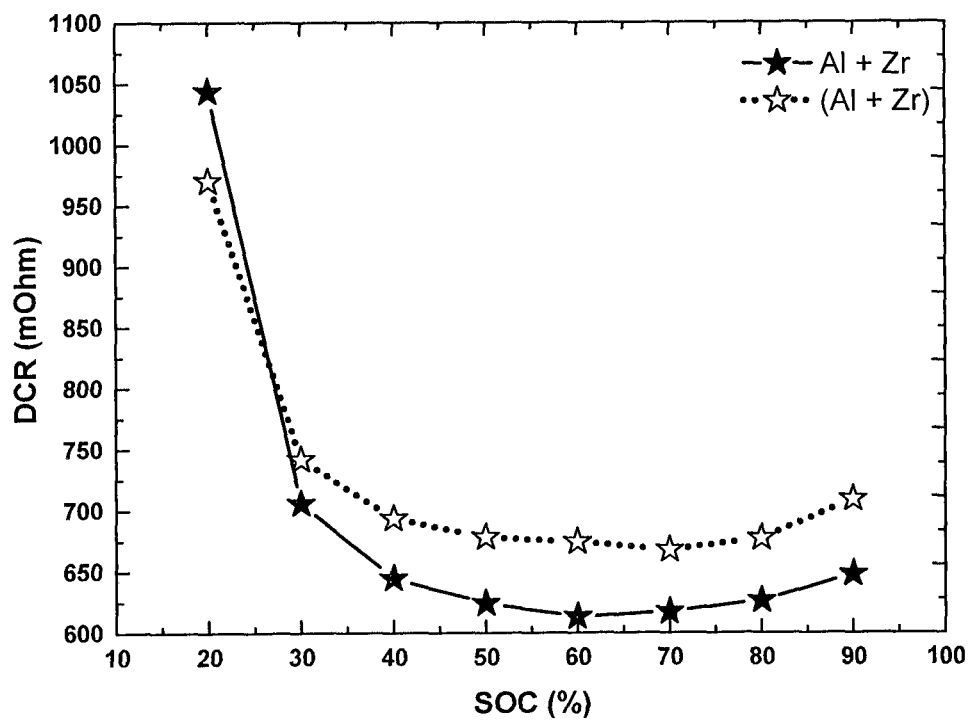
FIG. 15: Direct current resistance (DCR) measured by hybrid pulse power characterization at −10° C. at different state of charge (SOC) for NMC111: Al coated+Zr-doped according to the invention (-★-) vs. Zr-doped and Al coated followed by heat treatment (••☆••)
Figure 16:
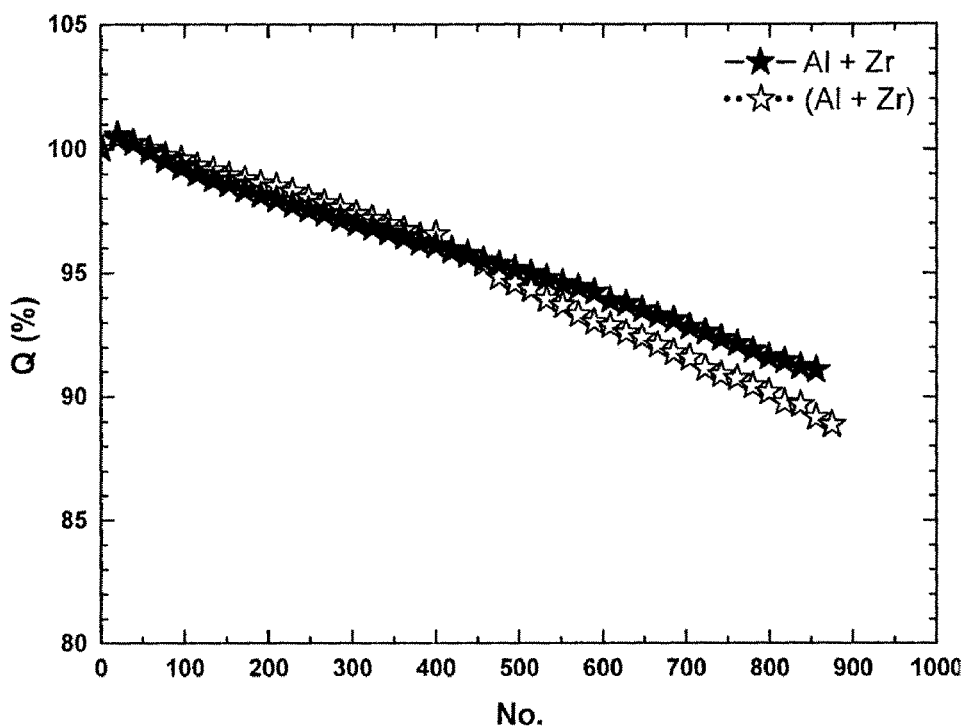
FIG. 16: Cycle life of 360 mAh cells at 4.2V measured at 45° C. at 1 C charge and discharge rate for NMC333: Al coated+Zr-doped according to the invention (-★-) vs. Zr-doped and Al coated followed by heat treatment (••☆••)
Figure 17:
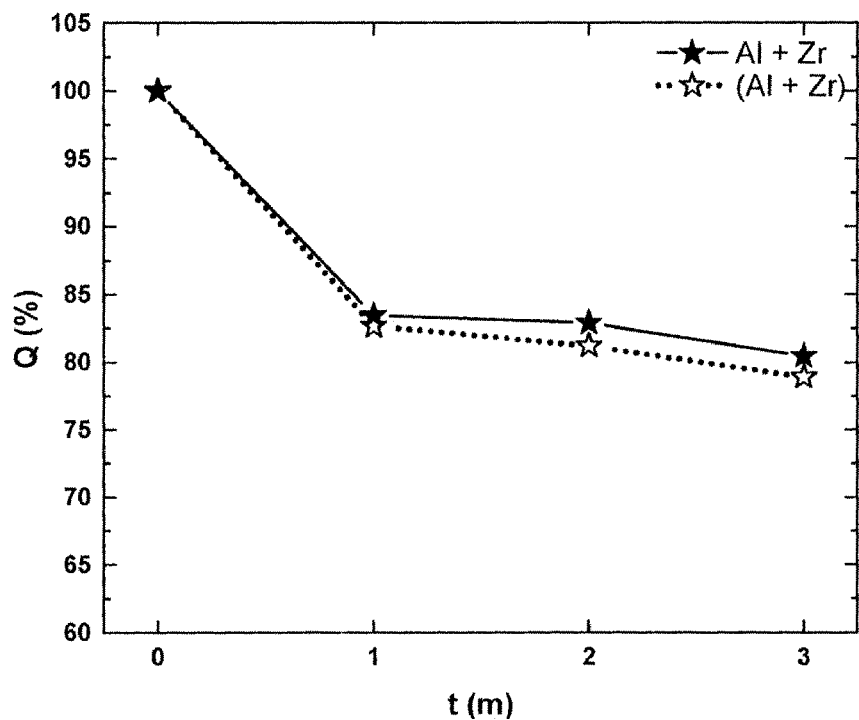
FIG. 17: Retention capacity ($Q_{ret}$) measured monthly during 60° C. storage test on 360 mAh cells for NMC111: Al coated+Zr-doped according to the invention (-★-) vs. Zr-doped and Al coated followed by heat treatment (••☆••)
Figure 18:
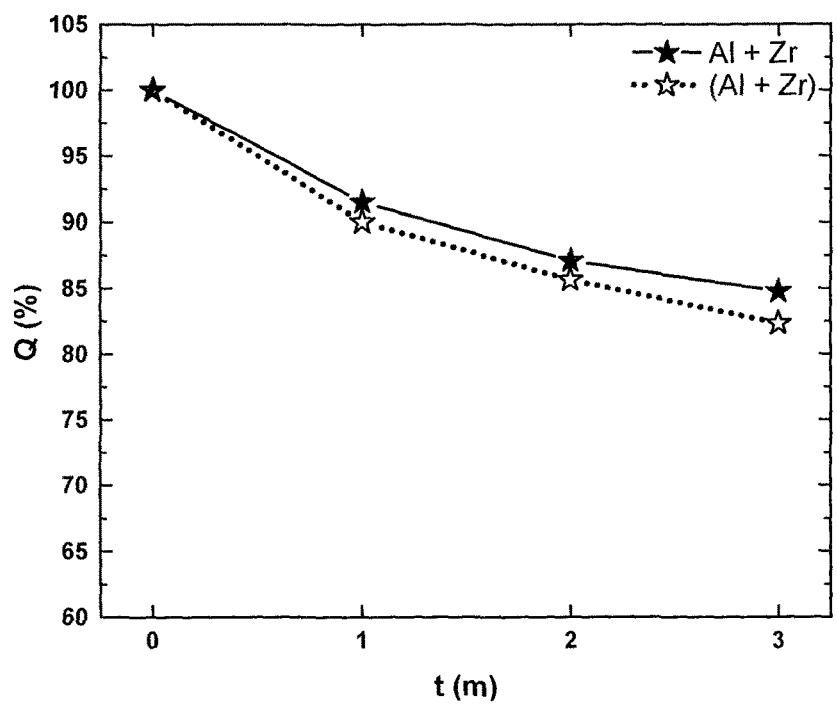
FIG. 18: Recovery capacity ($Q_{rec}$) measured monthly during 60° C. storage test on 360 mAh cells for NMC111: Al coated+Zr-doped according to the invention (-★-) vs. Zr-doped and Al coated followed by heat treatment (••☆••)
Figure 19:
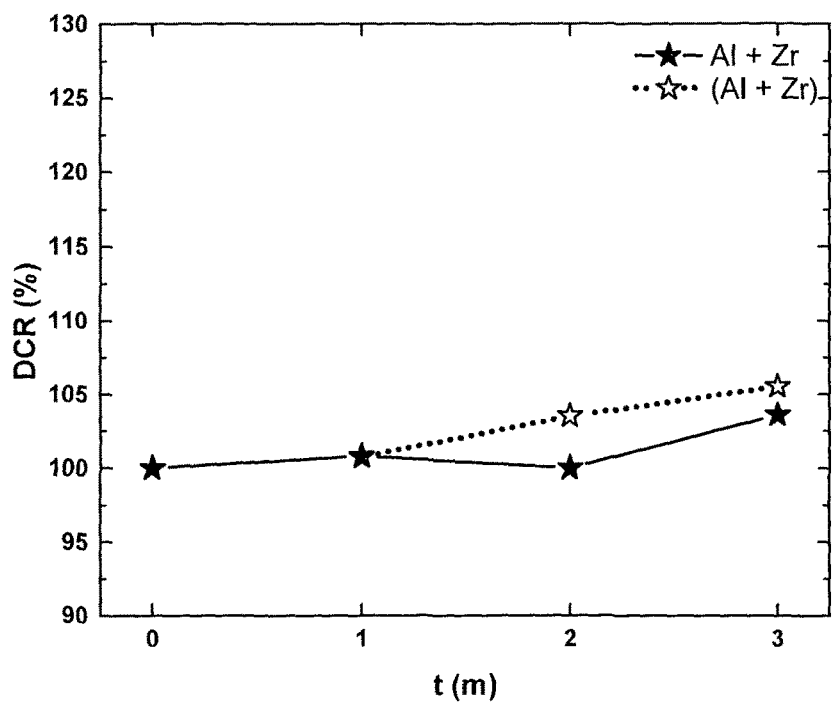
FIG. 19: Growth of direct current resistance (DCR) measured monthly in 60° C. storage test on 360 mAh cells for NMC111: Al coated+Zr-doped according to the invention (-☆-) vs. Zr-doped and Al coated followed by heat treatment (••☆••)

In this Counterexample 1 mol % Zr doped NMC111 is dry coated with 0.2 wt % $Al_2O_3$ nanoparticles and then heat treated at an intermediate temperature of 375° C. A gradient is achieved as some aluminum chemically attaches to the surface and/or diffuses into the outer parts of the core of the cathode powder, and some Li diffuses onto and/or into the alumina coating to form $LiAlO_2$. Its chemical performance is compared with that of Al dry coating+Zr doping material in FIGS. 14 to 19, which show Al dry coating is better than Al gradient coating in terms of DCR at room temperature (FIG. 14) and low temperature (−10° C., FIG. 15) (measurements as in Examples 1-2), cycle life at 45° C. (FIG. 16, measurements as in Example 3-4), retention capacity (FIG. 17), recovery capacity (FIG. 18) and DCR growth (FIG. 19) during 60° C. storage (measurements as in Example 5-6). In each of the FIGS. 14 to 19, -★- stands for the powders according to the present invention, ••☆•• for the powders of the Counterexample. As the heating temperature in US2011/0076556 is above the temperature in this Counterexample, the diffusion of Al and Li will be more pronounced, and the full cell test results for such materials will even be worse than for Counterexample 1.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

The invention claimed is:

1. A lithium metal oxide powder for use as a cathode material in a rechargeable battery, comprising Li metal oxide core particles having a general formula $Li_{1+d}(Ni_xMn_yCo_zZr_kM'_m)_{1-d}O_{2\pm e}A_f$; wherein $Al_2O_3$ is attached to surfaces of the core particles; wherein $0 \leq d \leq 0.08$, $0.2 \leq x \leq 0.9$, $0 < y \leq 0.7$, $0 < z \leq 0.4$, $0 \leq m \leq 0.02$, $0 < k \leq 0.05$, $0 \leq e < 0.02$, $0 \leq f \leq 0.02$ and $x+y+z+k+m=1$; M' selected from the group consisting of Al, Mg, Ti, Cr, V, Fe and Ga; A selected from the group consisting of F, P, C, Cl, S, Si, Ba, Y, Ca, B, Sn, Sb, Na and Zn; wherein an $Al_2O_3$ content in the powder is between 0.05 and 1 wt %, and wherein a concentration of Zr is higher at the surfaces than in bulks of the Li metal oxide core particles.

2. The lithium metal oxide powder according to claim 1, wherein the median particle size D50 of the core particles is between 2 and 5 μm.

3. The lithium metal oxide powder according to claim 1, wherein said $Al_2O_3$ constitutes a discontinuous coating on the surfaces of the core particles.

4. The lithium metal oxide powder according to claim 1, wherein said $Al_2O_3$ is attached to the surfaces of the core particles in the form of a plurality of discrete particles having a d50<100 nm.

5. The lithium metal oxide powder according to claim 3, wherein said $Al_2O_3$ is removably attached to the surfaces of the core particles.

6. The lithium metal oxide powder according to claim 1, wherein $0<x-y<0.4$ and $0.1<z<0.4$.

7. The lithium metal oxide powder according to claim 1, wherein each one of x, y and z is equal to $0.33\pm0.03$, and $0.04<d<0.08$.

8. The lithium metal oxide powder according to claim 1, wherein $x=0.40\pm0.03$, $y=0.30\pm0.03$, $z=0.30\pm0.03$ and $0.04 \leq d<0.08$.

9. The lithium metal oxide powder according to claim 1, wherein $x=0.50\pm0.03$, $y=0.30\pm0.03$, $z=0.20\pm0.03$ and $0.02<d<0.05$.

10. The lithium metal oxide powder according to claim 1, wherein $x=0.60\pm0.03$, $y=0.20\pm0.03$, $z=0.20\pm0.03$ and $0<d<0.03$.

11. A process of preparing a lithium metal oxide powder according to claim 1, the powder comprising Li metal oxide core particles and $Al_2O_3$ attached to the surfaces of the core particles, comprising:

providing $Al_2O_3$ powder having a volume V1, the $Al_2O_3$ powder being a nanometric, non-agglomerated powder;

providing a volume V2 of the Li metal oxide core material, said Li metal oxide core material having a general formula $Li_{1+d}(Ni_xMn_yCo_zZr_kM'_m)_{1-d}O_{2\pm e}A_f$, wherein $0 \leq d \leq 0.08$, $0.2 \leq x \leq 0.9$, $0<y \leq 0.7$, $0<z \leq 0.4$, $0 \leq m \leq 0.02$, $0<k \leq 0.05$, $0 \leq e<0.02$, $0 \leq f \leq 0.02$ and $x+y+z+k+m=1$; M' selected from the group consisting of Al, Mg, Ti, Cr, V, Fe and Ga; A selected from the group consisting of F, P, C, Cl, S, Si, Ba, Y, Ca, B, Sn, Sb, Na and Zn; and mixing the $Al_2O_3$ powder and the Li metal oxide core material in a dry-coating procedure, thereby covering the Li metal oxide core material with $Al_2O_3$ particles, the $Al_2O_3$ content in the lithium metal oxide powder being between 0.5 and 1 wt %.

12. The process according to claim 11, wherein during the step of mixing the $Al_2O_3$ powder and the Li metal oxide core material in a dry-coating procedure, the volume V1+V2=Va decreases, until the volume remains constant at a value Vb, thereby covering the Li metal oxide core material with $Al_2O_3$ particles.

13. A battery comprising a cathode material comprising the lithium metal oxide powder according to claim 1, wherein the battery is used in an automotive application.

14. A battery of a hybrid electric vehicle comprising a cathode material comprising the lithium metal oxide powder according to claim 1.

* * * * *